July 24, 1973  A. J. LENZI  3,748,215

HOLLOW TUBULAR WINDLACE

Filed Nov. 26, 1971

INVENTOR.
ANTHONY J. LENZI
BY Gumpston, Shaw
and Stephens
ATTORNEYS

United States Patent Office 3,748,215
Patented July 24, 1973

3,748,215
HOLLOW TUBULAR WINDLACE
Anthony J. Lenzi, Rochester, N.Y., assignor to The Schlegel Manufacturing Company, Rochester, N.Y.
Filed Nov. 26, 1971, Ser. No. 202,227
Int. Cl. B32b 3/20
U.S. Cl. 161—139    11 Claims

ABSTRACT OF THE DISCLOSURE

A windlace is extruded of a flexible, thermoplastic material to form a hollow tubular body with an integral flange. The interior of the tubular portion has a plurality of longitudinal ridges separated by longitudinal grooves to allow bending of the windlace without collapsing the tubular portion. The windlace is preferably extruded in a generally flat configuration, embossed, and then formed into a tube with two halves of the flange joined together in a longitudinal plane generally radial to the tube and extending between two halves of one of the internal ridges to support the windlace in the desired shape.

THE INVENTIVE IMPROVEMENT

Windlaces having generally cylindrical bodies and radial flanges have been used for years in automobiles for trimming around door openings and the like, and they have been formed as casings filled with resilient, compressible material to be flexible and yet retain their generally cylindrical body shape. This has required at least two separate parts and an assembly operation.

The invention involves recognition of the possibility of making such a windlace in a single extrusion by forming the cylindrical body as a hollow tube. The invention also recognizes the various requirements for an automotive windlace including appearance, flexibility, resilience, bending capacity, etc., and seeks an extruded hollow windlace meeting these requirements. In the work leading to the successful embodiment of the invention, it was discovered that a smooth-walled, hollow tube windlace kinks or collapses when the windlace is twisted or bent around relatively sharp curves. Embossed, transverse, internal ridges within the tubular portion of the windlace failed to solve the problem, but the inventive configuration meets all the automotive windlace requirements and alleviates the kinking or collapsing problem while retaining the desired flexibility and bending capacity. Hence, the invention succeeds at economy, simplicity, efficiency, reliability, and attractive appearance in an improved, hollow windlace.

SUMMARY OF THE INVENTION

The inventive windlace is configured to be extrudable from a flexible, thermoplastic material and include a hollow, tubular portion and an integral flange. The interior of the tubular portion has a plurality of longitudinal ridges separated by longitudinal grooves to allow bending of the windlace without collapsing the tubular portion. Preferably the flange is formed of two halves joined together along a longitudinal plane that preferably extends between two halves of one of the internal ridges within the tubular portion.

DRAWINGS

DETAILED DESCRIPTION

Figure 1:
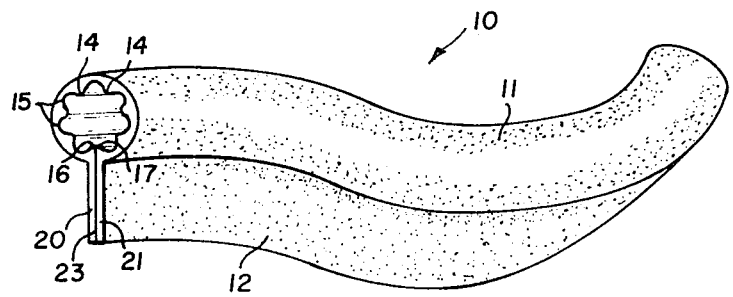
FIG. 1 is a perspective view of one preferred embodiment of the invention windlace.

Windlace 10 as shown in FIG. 1 has a generally cylindrical body 11 with a generally radial flange 12. Body 11 is preferably tubular as illustrated, with a hollow interior extending longitudinally of windlace 10.

Figure 2:
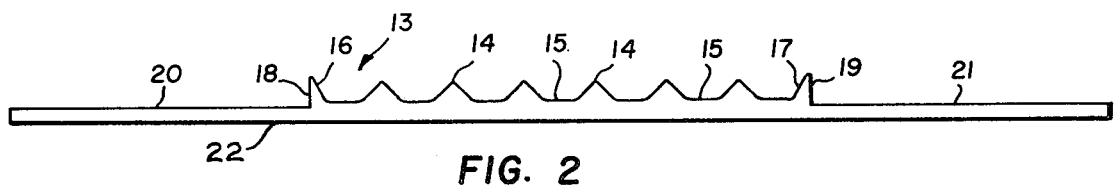
FIG. 2 is an end elevation of the preferred extrusion configuration for forming the inventive windlace.

Windlace 10 is preferably formed from the extrusion shape 13 shown in FIG. 2. Extrusion 13 has ridges 14 separated by grooves 15, preferably extending continuously throughout the length of the windlace. Somewhat taller ridges 16 and 17 at each end of the ridged portion of extrusion 13 have respective outside edges 18 and 19 that are preferably normal to the general plane of extrusion 13. Flange parts 20 and 21 extend outward beyond edges 18 and 19 as illustrated, and preferably lie in the general plane of extrusion 13.

Surface 22 of extrusion 13 is preferably embossed with a grain, fabric, or other desired pattern shortly after the formation of extrusion 13. Then extrusion 13 is folded or bent to form cylindrical, tubular body 11 as shown in FIG. 1, and flange parts 20 and 21 are joined together along a longitudinal plane 23 that is generally radial to tubular body 11. Cement, adhesive, thermoplastic fusion, chemical bonding or mechanical fastening can be used to secure flange parts 20 or 21.

In the final configuration illustrated in FIG. 1, flange parts 20 and 21 are bent approximately 90° from their extruded relationship to the ridged and grooved portion of extrusion 13 to align with edges 18 and 19 of ridges 16 and 17. The longitudinal junction plane 23 between flange parts 20 and 21 then extends between ridges 16 and 17 which form the halves of an internal ridge within tubular body 11 preferably taller than the other internal ridges 14, as illustrated. This bonds together edges 18 and 19 for a sufficient distance radially inward of tube 11 to support tube 11 in a full cylindrical shape and prevent its tendency to form an elliptical or egg-shaped cross section curving gently into flange 12. This ensures a full circular body shape valued for its appearance in the automotive industry.

Grooves 15 between ridges 14 allow some stretching and compression of the windlace material when the windlace is bent or twisted so that tubular body 11 follows the bending and twisting without kinking or collapsing. Windlace 11 is preferably formed of a synthetic thermoplastic material that is flexible and elastomeric to accommodate the bends and twists required. If tubular body 11 were made smooth-walled both inside and out it would kink and collapse when bent, even if its walls were relatively thick. The ridges 14 and grooves 15 formed internally of tubular body 11 effectively prevent this, and make windlace 10 meet automotive standards for bending and twisting without collapse.

Figure 3:
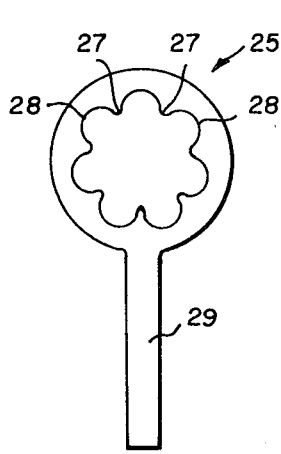
FIGS. 3 and 4 are preferred alternative versions of the inventive windlace.

Windlace 25 as shown in FIG. 3, has substantially the same shape as windlace 10 except that it is extruded in final form with a hollow tubular body 26 having internal ridges 27 and internal grooves 28 extending longitudinally, and an integral flange 29 generally radial to tubular body 26. Windlace 25 functions in the same way as windlace 10 and can be bent and twisted without kinking or collapsing.

The external embossing of windlace 25 is more difficult than embossing the flat extrusion 13 of FIG. 2, but it can be accomplished with a pair of rollers shaped to fit each outer half of windlace 25. Then windlace 25 can be extruded in the illustrated shape and embossed shortly thereafter to form a continuous length.

Figure 4:
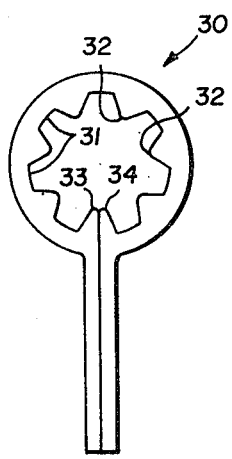

Windlace 30 of FIG. 4 is another preferred embodiment of the inventive windlace and differs from windlace 10 only in having nearly flat-bottomed grooves 31 separating internal ridges 32. Ridges 32 can also be more pointed, or more blunt-topped as desired, and ridges and grooves internal to the inventive windlace can have many shapes, sizes, and numbers. The edge ridges 33 and 34 forming halves of a relatively larger internal ridge extend radially inward further than ridges 32 to help support windlace 30 in its circular, tubular shape as previously described.

Those skilled in the art will appreciate that many different materials can be used for forming windlaces according to the invention, and that windlaces for different purposes can have different embossings, different thicknesses, different flange widths, tube sizes, etc. As tube diameters increase, internal ridges are preferably heightened and increased in number, and ridges and grooves can have several workable shapes. Such windlaces can be extruded in final form or folded up from flat extrusions with flange parts joined together as described. Although the joining of flange parts to form the final windlace is preferably by fusion, other fastening means can be used.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will understand how to adapt the inventive windlace to many specific uses and configurations.

I claim:
1. A windlace comprising:
   (a) a body configured to be extrudable from a flexible, thermoplastic material;
   (b) said body including a hollow, tubular portion and an integral flange; and
   (c) the interior of said tubular portion having a plurality of longitudinal ridges separated by longitudinal grooves to allow bending of said windlace without collapsing said tubular portion.
2. The windlace of claim 1 wherein said flange is formed of two halves joined together along a longitudinal plane.
3. The windlace of claim 2 wherein said longitudinal plane is generally radial to said tubular portion.
4. The windlace of claim 2 wherein said longitudinal plane extends between two halves of one of said internal ridges.
5. The windlace of claim 4 wherein said ridge bisected by said longitudinal plane is taller than the other of said ridges.
6. The windlace of claim 5 wherein said longitudinal plane is generally radial to said tubular portion.
7. The windlace of claim 1 wherein the exterior surface of said windlace is embossed.
8. The windlace of claim 1 wherein said ridges and grooves are continuous throughout the length of said windlace.
9. The windlace of claim 8 wherein said flange is formed of two halves joined together along a longitudinal plane generally radial to said tubular portion.
10. The windlace of claim 9 wherein said longitudinal plane extends between two halves of one of said internal ridges.
11. The windlace of claim 10 wherein said ridge bisected by said longitudinal plane is taller than the other of said ridges.

References Cited
UNITED STATES PATENTS

| | | | |
|---|---|---|---|
| 2,121,854 | 6/1938 | Breer | 49—498 |
| 2,671,041 | 3/1954 | Dodge | 49—498 X |
| 3,527,013 | 9/1970 | Kruschwitz | 161—100 X |
| 3,635,787 | 1/1972 | Shanok et al. | 161—121 |

WILLIAM A. POWELL, Primary Examiner

U.S. Cl. X.R.

49—498; 156—218, 219; 161—122, 123, 413